United States Patent [19]

Nakabayashi

[11] Patent Number: 5,444,852
[45] Date of Patent: Aug. 22, 1995

[54] I/O DEVICE INTERFACE HAVING BUFFER MAPPED IN PROCESSOR MEMORY ADDRESSING SPACE AND CONTROL REGISTERS MAPPED IN PROCESSOR I/O ADDRESSING SPACE

[75] Inventor: Takeo Nakabayashi, Hyogo, Japan

[73] Assignee: Mitsubishi Denki Kabushiki Kaisha, Tokyo, Japan

[21] Appl. No.: 780,584

[22] Filed: Oct. 22, 1991

[30] Foreign Application Priority Data

Oct. 26, 1990 [JP] Japan .................................. 2-290117

[51] Int. Cl.6 .................. G06F 13/00; G06F 13/12
[52] U.S. Cl. ................ 395/823; 364/DIG. 1; 364/239; 364/238.3
[58] Field of Search ............... 395/275, 325, 250

[56] References Cited

U.S. PATENT DOCUMENTS

| 4,475,155 | 10/1984 | Oishi et al. | 395/275 |
|---|---|---|---|
| 4,646,230 | 2/1987 | Eguchi . | |
| 4,809,217 | 2/1989 | Floro et al. | 395/275 |
| 4,815,034 | 3/1989 | Mackey | 395/275 |
| 4,816,815 | 3/1989 | Yoshiba | 340/750 |
| 4,821,185 | 4/1989 | Esposito | 395/275 |
| 5,003,465 | 3/1991 | Chisholm et al. | 395/275 |
| 5,016,160 | 5/1991 | Lambeth et al. | 395/275 |

FOREIGN PATENT DOCUMENTS 3725343  2/1988  Germany .

OTHER PUBLICATIONS

Eggebrecht, Lewis, "Interfacing to the IBM Personal Computer", 1990 pp. 4, 50 193-209.
"Programmable Address Decoder", IBM Technical Disclosure Bulletin, vol. 32, No. 8A, Jan. 1990 pp. 1-3.
"PC-Hardwarebuch", by Hans-Peter Messmer, Addison-Wesley Publishing Co., Bonn 1992, pp. 134-136.
Intel Corporation, *Hardware Reference Manual*, 1987, p. 8-1.

Primary Examiner—Thomas C. Lee
Assistant Examiner—D. Dinh
Attorney, Agent, or Firm—Lowe, Price, LeBlanc & Becker

[57] ABSTRACT

An I/O device includes a memory and a transmission reception control circuit addresses on the memory space are assigned to the memory. The transmission reception control circuit includes a plurality of registers to which addresses on the I/O space are assigned. The memory stores data to be transmitted to an external equipment or data received from the external equipment. The plurality of registers hold control data. The memory and the transmission reception control circuit are selectively activated in response to an identification signal. The transmission reception control circuit reads out data to be transmitted to the external equipment from the memory or writes data received from the external equipment into the memory in response to the control data held in the plurality of registers.

12 Claims, 10 Drawing Sheets

I/O DEVICE INTERFACE HAVING BUFFER MAPPED IN PROCESSOR MEMORY ADDRESSING SPACE AND CONTROL REGISTERS MAPPED IN PROCESSOR I/O ADDRESSING SPACE

BACKGROUND OF THE INVENTION

1. Field of the Invention

The invention generally relates to input/output devices and, more particularly, relates to input/output devices for controlling input/output in a separate-type input/output (hereinafter referred to as "I/O") system and an operating method thereof.

2. Description of the Background Art

There are a separate-type I/O system (I/O mapped I/O system) and a memory mapped I/O system in input/output systems of microprocessors. FIG. 10 shows an address space in an I/O mapped I/O system and FIG. 11 shows an address space in a memory mapped I/O system.

As shown in FIG. 10, memories are arranged in a memory space and input/output devices (hereinafter referred to as "I/O devices") are arranged in an I/O space in the I/O mapped I/O system. As shown in FIG. 11, I/O devices are arranged in a part of the region on the memory space in the memory mapped I/O system.

FIG. 12 is a block diagram showing a structure of an I/O mapped I/O system containing conventional I/O devices.

I/O devices 100 and memories 300 are connected to a central processing unit (hereinafter referred to as "CPU") 200 through a data bus DB, an address bus AB and a control bus CB. An identification signal M/I supplied from CPU200 is applied to a decoder 400 through an inverter G4. A plurality of output signals of decoder 400 are supplied to I/O devices 100 as chip select signals CS. An identification signal M/I supplied from CPU200 is applied to a decoder 500. A plurality of output signals of decoder 500 are supplied to memories 300 as chip select signals CS, respectively.

Address signals A15-A4 are supplied to decoder 400 and address signals A3-A0 are supplied to I/O devices 100. Address signals A19-A10 are supplied to decoder 500 and address signals A9-A0 are supplied to memories 300. Addresses within the I/O space designated by the address signals A15-A0 are thereby assigned to I/O devices 100, and addresses within the memory space designated by the address signals A19-A0 are assigned to memories 300.

The identification signal M/I is used for identifying whether address signals on address bus AB indicate an address on the I/O space or an address on the memory space. Either of decoder 400 and decoder 500 is activated in response to the identification signal M/I. The output signal of decoder 400 activates any one of I/O devices 100. The output signal of decoder 500 activates any one of memories 300.

An external equipment such as a printer, a keyboard, and a communication line is connected to I/O devices 100. Since the operation speed of the external equipment is normally different from that of CPU200, each of I/O devices 100 has a register for temporarily storing data to be transmitted to the external equipment and data received from the external equipment. Each of I/O devices 100 functions as an interface between CPU200 and the external equipment.

Data supplied from CPU200 or data read out from memories 300 through CPU200 is transmitted to the registers within I/O devices 100 through data bus DB and temporarily stored therein. The stored data is transmitted to the external equipment.

Data received from the external equipment is temporarily stored in the registers within I/O devices 100. The stored data is transmitted to CPU200 through data bus DB or to memories 300 through CPU200. I/O devices 100 are controlled by a control signal supplied from CPU200 through control bus CB.

It is necessary to increase the storage capacity of the register included in each of I/O devices 100 in order to increase the amount of data to be inputted to/outputted from the external equipment in the I/O mapped I/O system as stated above. The I/O space, however, is generally smaller than the memory space.

Additionally, even if the I/O space is large, the software thereof becomes complicated in order to access the large I/O space.

Furthermore, if the storage capacity of the registers within I/O devices 100 is small, when a large amount of data is to be transmitted to the external equipment, the data needs to be transmitted many times from CPU200 or memories 300 through data bus DB. Data bus DB cannot be used for other processing during the data transmission.

SUMMARY OF THE INVENTION

An object of the present invention is to improve the processing efficiency in an I/O mapped I/O system.

Another object of the present invention is to provide input/output devices and an operating method thereof in which a large amount of data can be inputted to/outputted from an external equipment by simple processing without occupying a data bus for a long period of time in an I/O mapped I/O system even if the I/O space is small.

Still another object of the present invention is to make it possible to simplify a software for accessing the I/O space in an I/O mapped I/O system.

An input/output device according to the present invention includes a storage device to which addresses on the memory space are assigned, a control device to which addresses on the I/O space are assigned, and a designation signal receiving circuit for receiving a designation signal for designating whether an address signal supplied through a common address bus indicates an address on the memory space or an address on the I/O space. The storage device stores data to be transmitted to an external equipment or data received from the external equipment. The control device includes a holding device for holding control data and controls reading of data to be transmitted to the external equipment from the storage device and writing of data received from the external equipment in the storage device in response to the control data held in the holding circuit. The storage device and the control device are selectively activated in response to a designation signal.

When a designation signal designates the memory space, the storage device is activated. The transmission data is written into the storage device or the reception data stored in the storage device is read out in response to an address signal supplied from the central processing unit through the address bus.

When the designation signal designates the I/O space, the control device is activated. Control data is stored in the holding device within the control device in response to an address signal supplied from the central processing unit through the address bus. The control device reads out transmission data from the storage device and transmits the same to the external equipment or writes the reception data supplied from the external equipment into the storage device based on the control data.

In the input/output device according to the present invention, as the storage device for temporarily storing the transmission data and the reception data is located in the memory space, a large amount of data can be inputted to/outputted from the external equipment even if the I/O space is small.

As transmission/reception of data between the storage device and the external equipment can be controlled by the control data held in the holding device within the control device, the software is made simple.

Furthermore, since the data bus is released after the control data is held in the holding device within the control device, the time period when the data bus is occupied is shortened.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
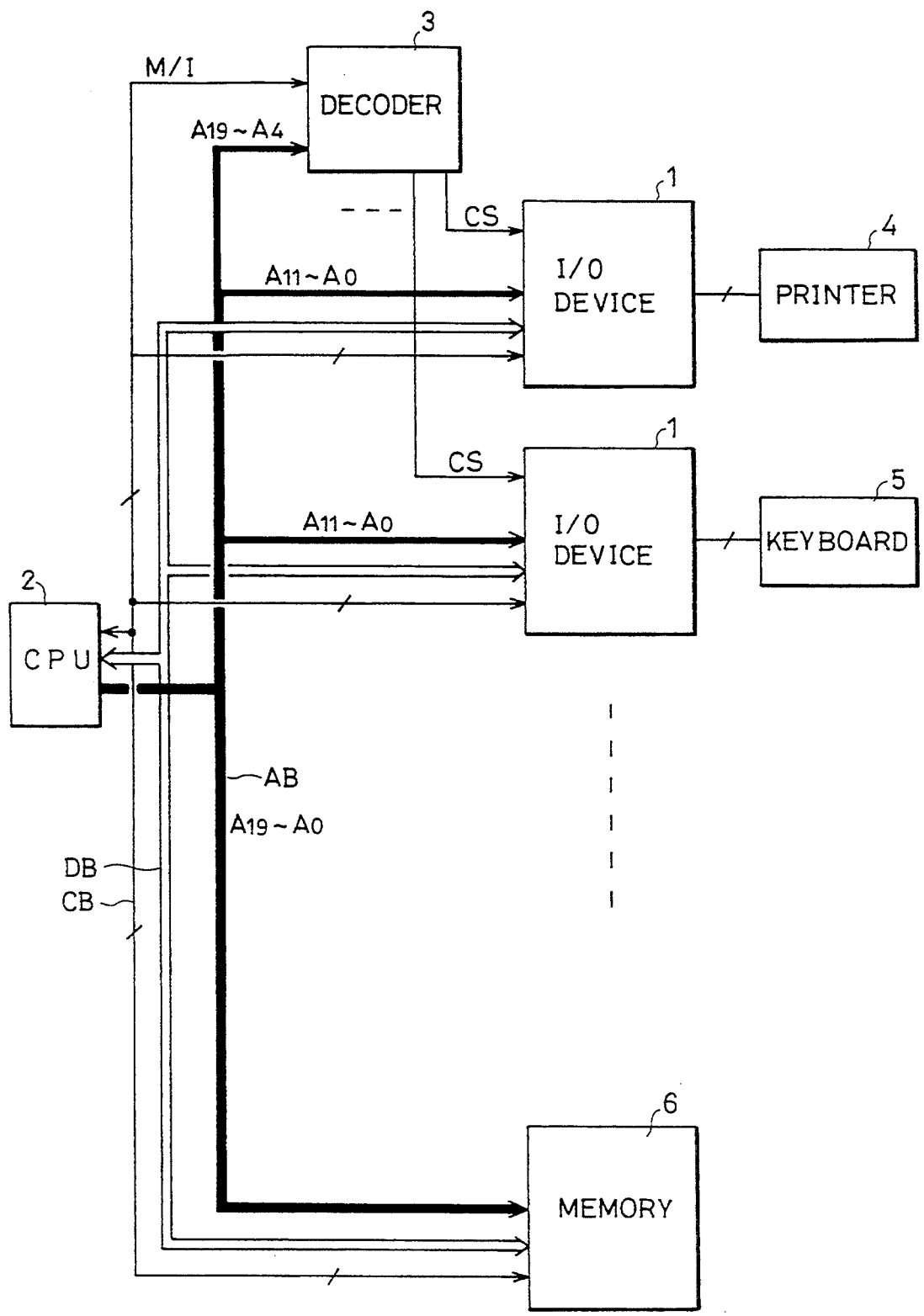
FIG. 1 is a block diagram showing a structure of an I/O mapped I/O system employing I/O devices according to one embodiment of the present invention.

FIG. 1 is a block diagram showing the structure of an I/O mapped I/O system employing input/output devices (hereinafter referred to as "I/O devices") according to one embodiment of the present invention.

Each of I/O devices 1 includes a semiconductor integrated circuit. The plurality of I/O devices 1 and a memory 6 is connected to a CPU2 through a data bus DB, an address bus AB and a control bus CB. An identification signal M/I is supplied to a decoder 3 through one control line included in control bus CB. Address signals A19-A4 are applied to decoder 3. Address signals A11-A0 are supplied to each of I/O devices 1 and address signals A19-A0 are supplied to memory 6.

An external equipment such as a printer 4, a keyboard 5 is connected to each of I/O devices 1. Communication lines or other external equipment may be connected to each of I/O devices 1.

Either of decoder 3 and memory 6 is activated in response to the identification signal M/I. Decoder 3 decodes the address signals A19-A4 and supplies a chip select signal CS to any one of the plurality of I/O devices 1. Each of I/O devices 1 is activated in response to the chip select signal CS.

Figure 2:
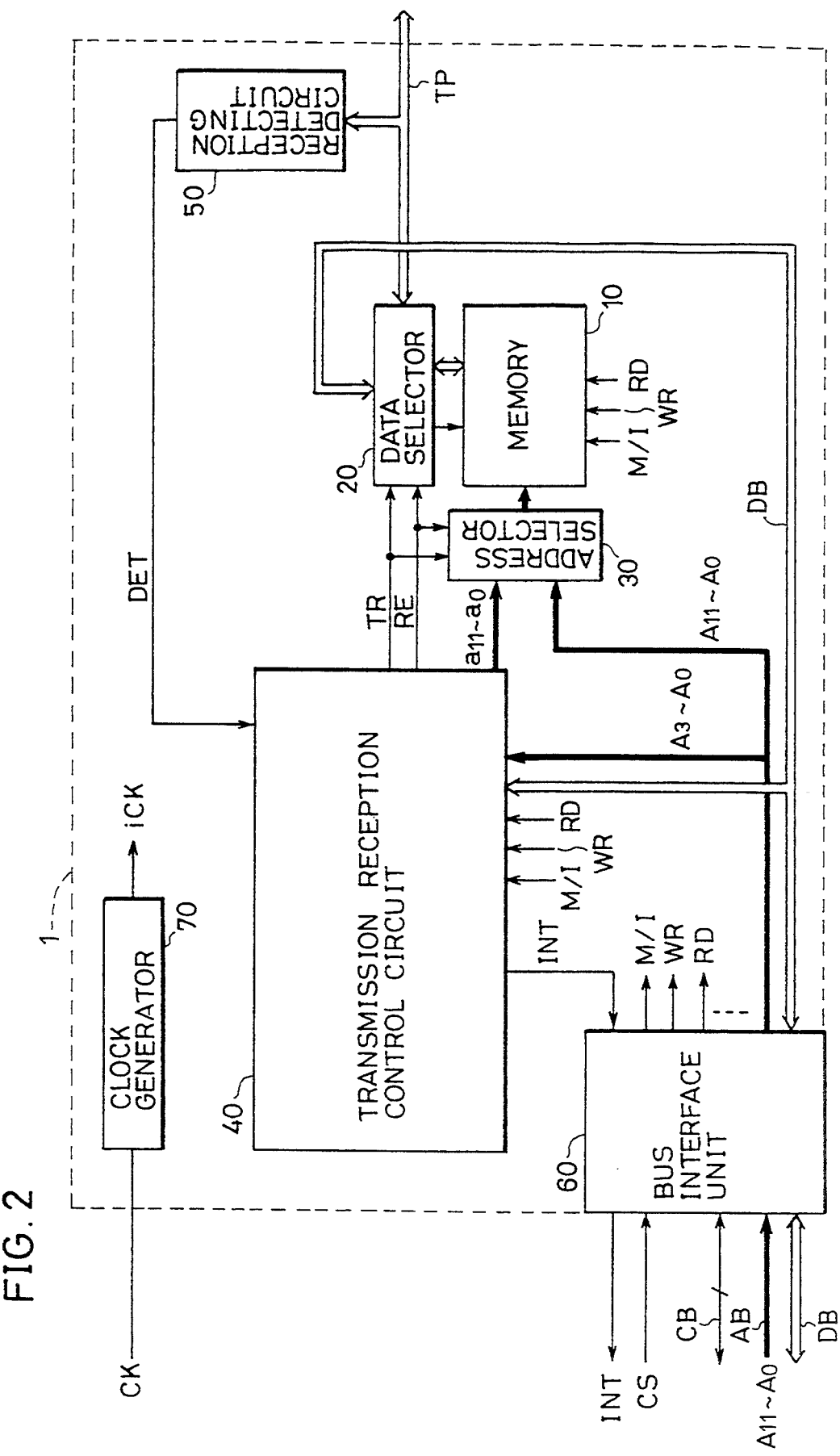
FIG. 2 is a block diagram showing a structure of an I/O device according to the embodiment.

FIG. 2 is a block diagram showing the structure of I/O device 1.

I/O device 1 includes a memory 10 for storing transmission data to the external equipment and reception data from the external equipment, a data selector 20, an address selector 30, a transmission reception control circuit 40 for controlling the transmitting operation and the receiving operation, a reception detecting circuit 50, a bus interface unit 60 and a clock generator 70.

Bus interface unit 60 is connected to a data bus DB, an address bus AB and a control bus CB. A chip select signal CS is supplied to bus interface unit 60 from decoder 3 (see FIG. 1). Address signals A11-A0 are supplied to address selector 30 from bus interface unit 60 and address signals A3 to A0 are supplied to transmission reception control circuit 40 from bus interface unit 60.

Bus interface unit 60 generates an identification signal M/I, a write signal WR and a read signal RD in response to a control signal supplied through control bus CB. The identification signal M/I, the write signal WR and the read signal RD are supplied to memory 10 and transmission reception control circuit 40.

Transmission reception control circuit 40 supplies address signals A11-A0 to address selector 30 at the time of transmitting and receiving data. Address selector 30 selects either one of the address signals A11-A0 supplied from bus interface unit 60 and the address signals a11-a0 supplied from transmission reception control circuit 40 and supplies the same to memory 10 in response to the control signal from transmission reception control circuit 40.

Data selector 20 and transmission reception control circuit 40 are connected to bus interface unit 60 through data bus DB. Data selector 20 is also connected to the external equipment through a data transmission path TP. Data selector 20 selects either of data bus DB and data transmission path TP and connects the same to memory 10 in response to the control signal from transmission reception control circuit 40.

Reception detecting circuit 50 detects that data is transmitted from the external equipment through data transmission path TP and supplies a detection signal DET to transmission reception control circuit 40. Transmission reception control Circuit 40 generates a transmission instruction signal TR instructing to transmit data and a reception instruction signal RE instructing to receive data and supplies the same to address selector 30 and data selector 20.

Clock generator 70 externally receives a system clock signal CK and generates an internal clock signal iCK for controlling the timing of each of internal circuits.

Figure 3:
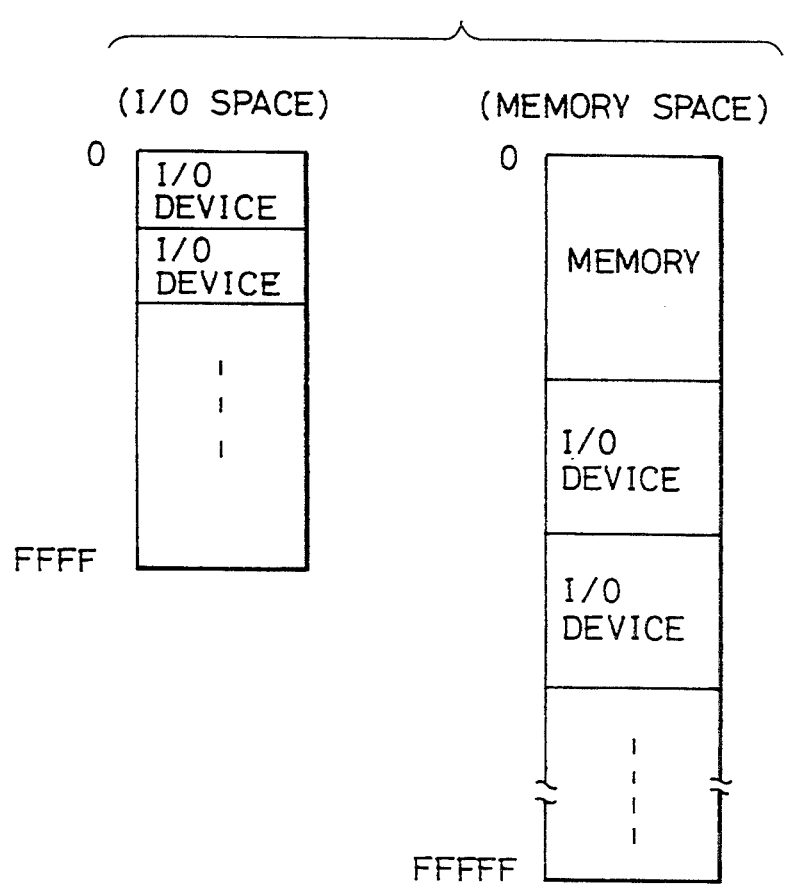
FIG. 3 is a diagram showing an address space in the I/O mapped I/O system in FIG. 1.

FIG. 3 is a diagram showing the memory space in the system of FIG. 1. Transmission reception control circuit 40 within I/O device 1 is located in the I/O space and memory 10 within I/O device 1 is located in a part of the region within the memory space. Memory 6 shown in FIG. 1 is located in the other region of the memory space.

In FIG. 2, an address on the memory space is designated by the address signals A11-A0 supplied to address selector 30. An address on the I/O space is designated by the address signals A3-A0 supplied to transmission reception control circuit 40. Whether the address signals A11-A0 on address bus AB indicate an address on the memory space or an address on the I/O space is identified by the identification signal M/I.

Figure 4:
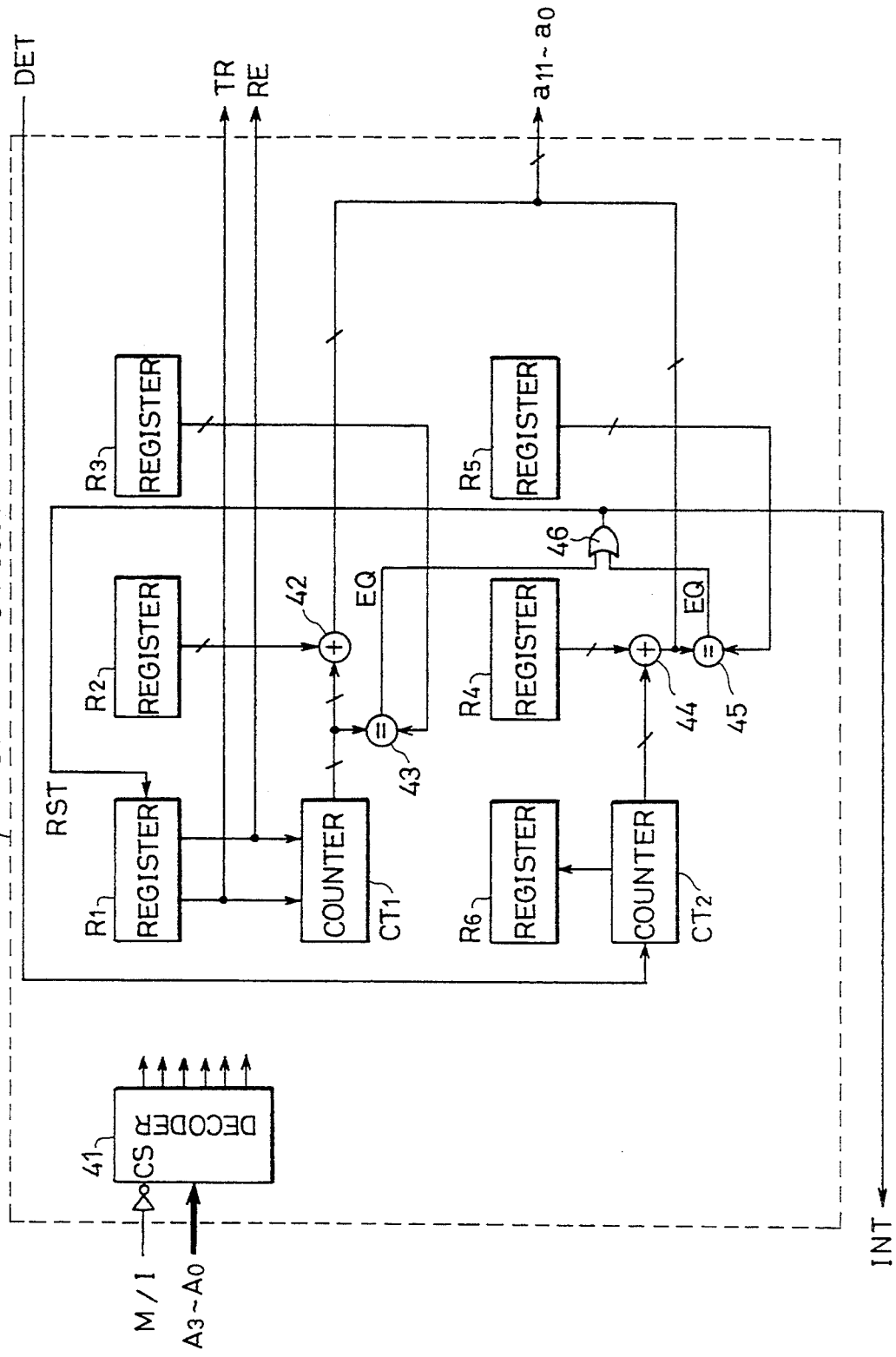
FIG. 4 is a block diagram showing the structure of a transmission reception control circuit included in the I/O device of FIG. 2.

FIG. 4 is a diagram showing in detail the structure of transmission reception control circuit 40.

Transmission reception control circuit 40 includes a decoder 41, first to sixth registers R1-R6, first and second counters CT1, CT2, adders 42, 44, comparators 43, 45 and an OR gate 46.

Decoder 41 is activated by the identification signal M/I, decodes the address signals A3-A0, and activates any one of the first to sixth registers R1-R6.

Figure 5:
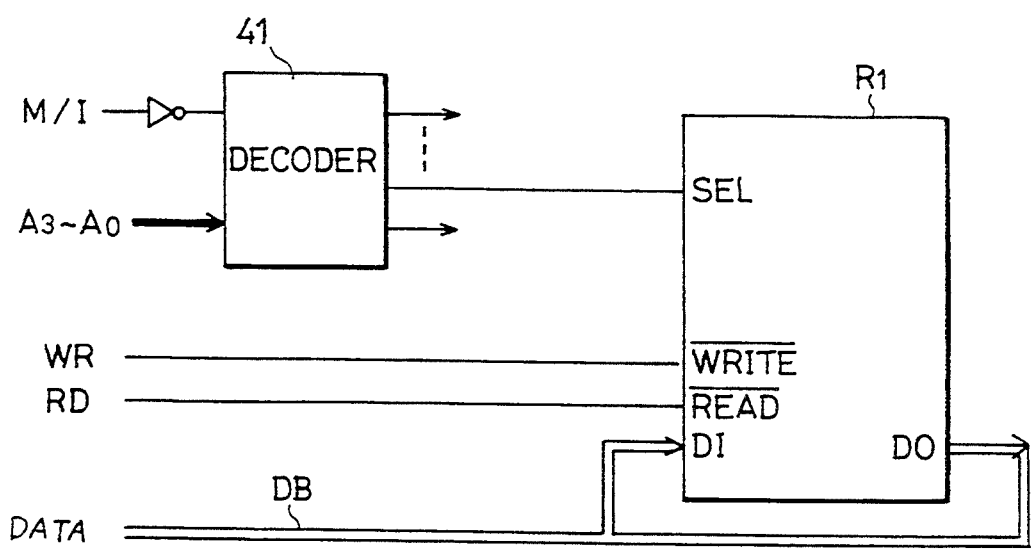
FIG. 5 is a block diagram showing the structure of a first register included in FIG. 4.

The structure of the first register R1 is shown in FIG. 5. One output signal of decoder 41 is supplied to a select terminal SEL of the first register R1. A write signal WR and a read signal RD are supplied to a write control terminal $\overline{\text{WRITE}}$ and a read control terminal READ of the first register R1, respectively. A data input terminal DI and a data output terminal DO of the first register R1 are connected to data bus DB. The structures of the second to sixth registers R2-R6 are the same as that shown in FIG. 5.

The output signal of decoder 41, the write signal WR, the read signal RD and data bus DB are omitted in FIG. 4 in order to simplify the figure.

Figure 6:
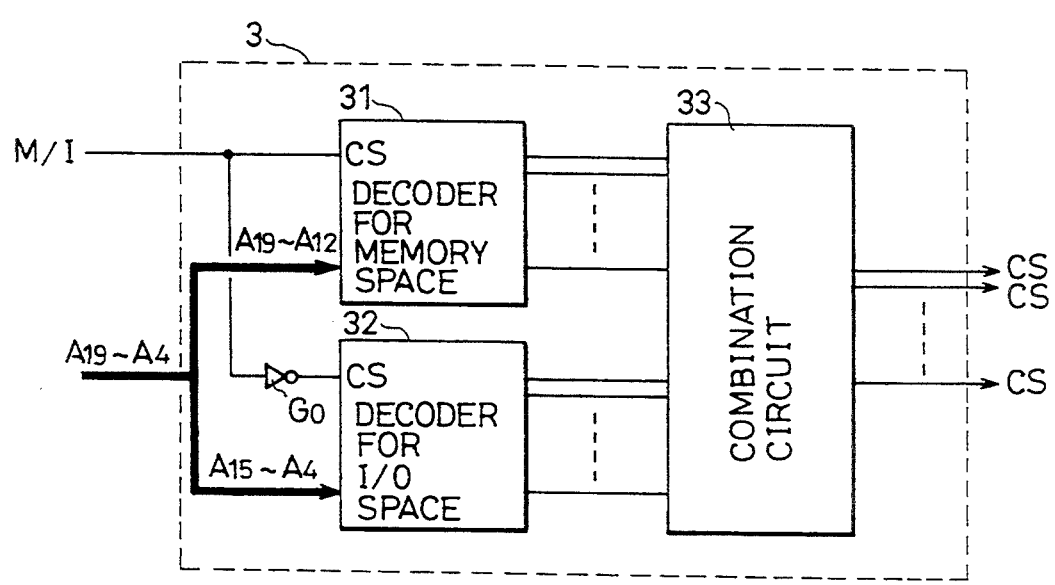
FIG. 6 is a block diagram showing the structure of the decoder shown in FIG. 1.

FIG. 6 is a block diagram showing the structure of decoder 3 shown in FIG. 1.

Decoder 3 includes a decoder for the memory space 31, a decoder for the I/O space 32 and a combination circuit 33. The identification signal M/I is supplied to the chip select terminal CS of memory space decoder 31. The identification signal M/I is supplied to the chip select terminal CS of I/O space decoder 32 through an inverter GO. The address signals A19-A12 are supplied to memory space decoder 31 and the address signals A15-A4 are supplied to I/O space decoder 32.

Combination circuit 33 applies a chip select signal CS to any one of the plurality of I/O devices 1 in response to an output signal of memory space decoder 31 and an output signal of I/O space decoder 32.

Figure 7:
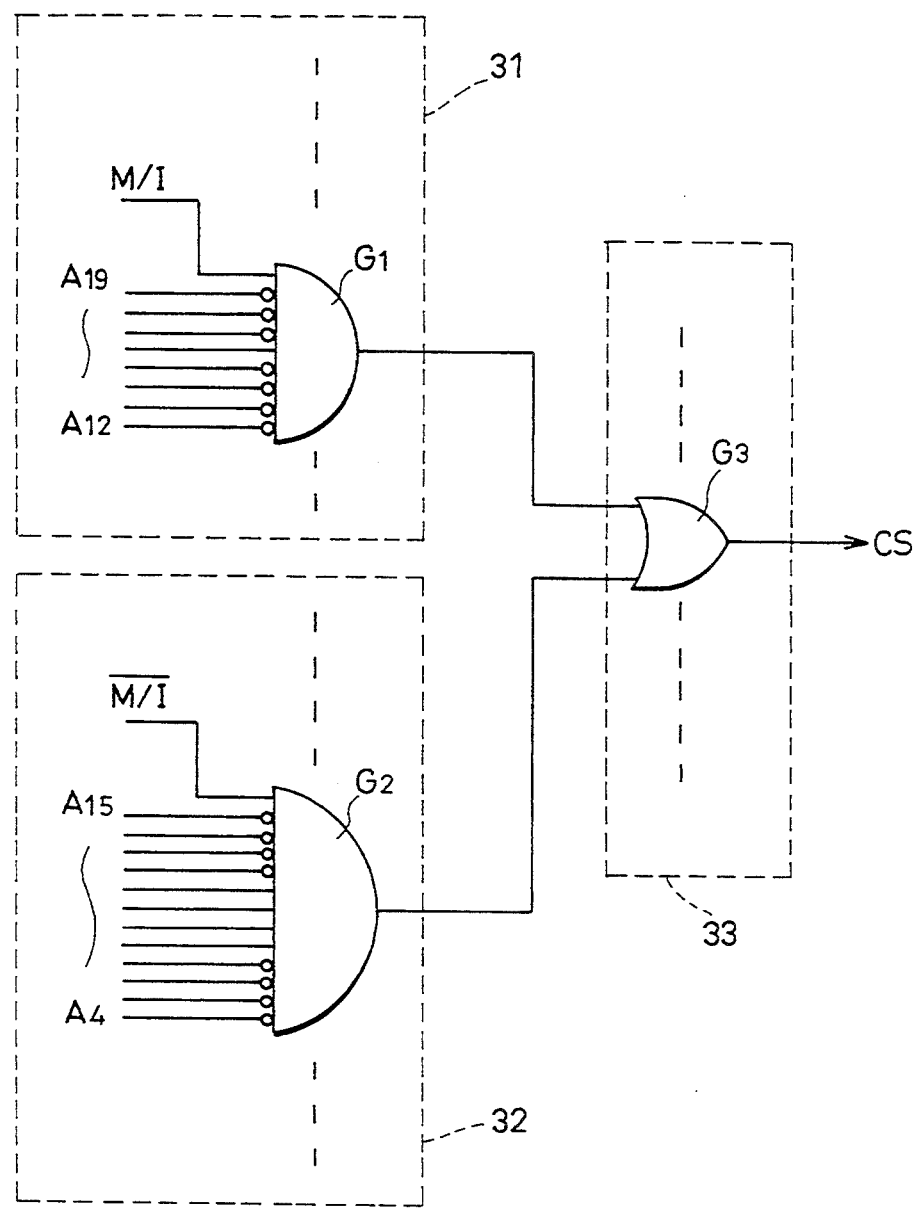
FIG. 7 is a diagram showing in detail the structure of the decoder of FIG. 6.

FIG. 7 shows the structures of memory space decoder 31, I/O space decoder 32 and combination circuit 33.

Memory space decoder 31 includes a plurality of AND gates G1. An identification signal M/I and address signals A19-A12 or inverted signals thereof are supplied to each of AND gates G1. I/O space decoder 32 includes a plurality of AND gates G2. An inverted signal M/I of the identification signal M/I and address signals A15-A4 or inverted signals thereof are supplied to each of AND gates G2.

Combination circuit 33 includes a plurality of OR gates G3. An output signal of one AND gate G1 in memory space decoder 31 and an output signal of one AND gate G2 in I/O space decoder 32 are supplied to each of OR gates G3. An output signal of each of OR gates G3 is a chip select signal CS.

The operation of I/O devices 1 will now be described with reference to FIGS. 1 and 2.

Firstly, a description will be made of the operation of writing transmission data into memory 10 within I/O device 1 from CPU2. In this case, the identification signal M/I designates the memory space. CPU2 supplies transmission data to data bus DB. Data selector 20 supplies the transmission data of data bus DB to memory 10. Address selector 30 applies the address signals A11-A0 to memory 10. As a result, the transmission data is written into the address designated by the address signals A1-A0.

The operation of reading the reception data stored in memory 10 will now be described. In this case as well, the identification signal M/I designates the memory space. Address selector 30 supplies the address signals A11-A0 to memory 10. As a result, reception data is read out from the address designated by the address signals A11-A0. Data selector 20 provides the reception data read out from memory 10 to data bus DB. The reception data on data bus DB is transmitted to CPU2.

Figure 8:
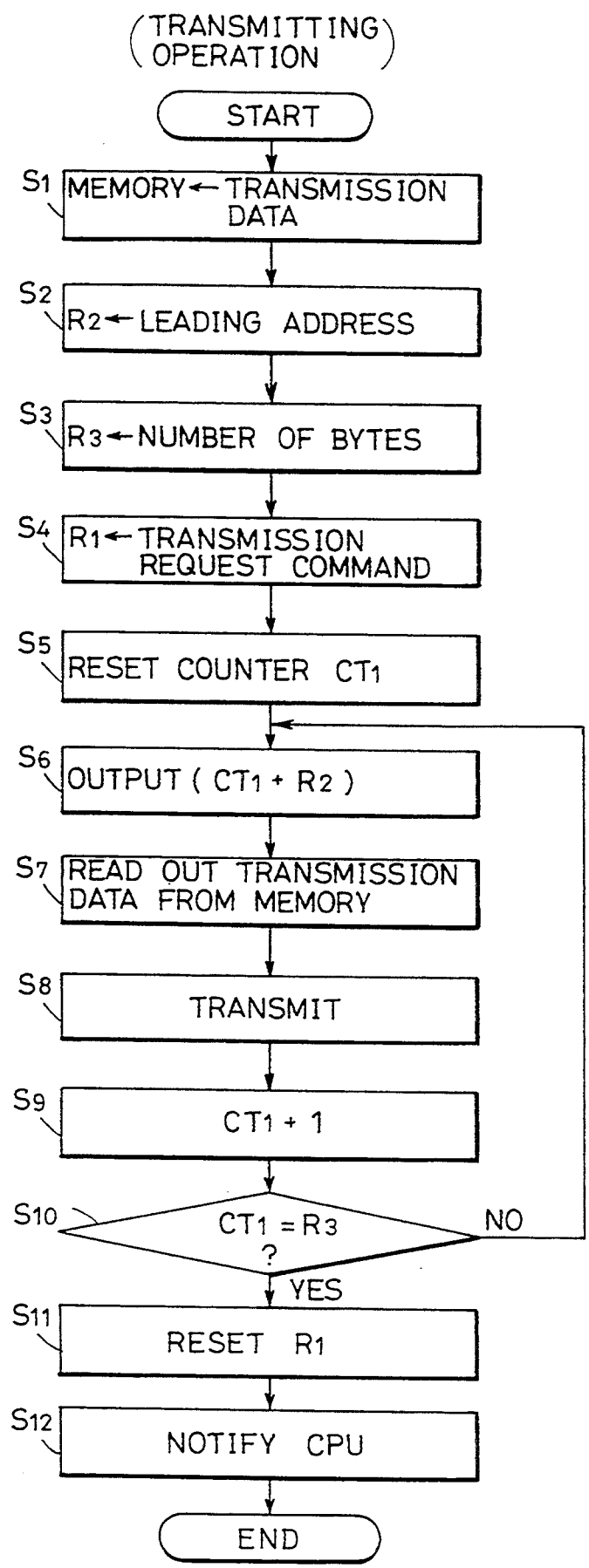
FIG. 8 is a flow chart showing a transmitting operation by the I/O device in the embodiment.

The operation of transmitting data from memory 10 within I/O device 1 to an external equipment will now be described with reference to FIGS. 4 and 8.

Firstly, transmission data is written in memory 10 within I/O device 1 from CPU2 by the operation stated above (step S1).

Then, the identification signal M/I designates the I/O space. At first, data representing a leading address is written into the second register R2 (see FIG. 4) within transmission reception control circuit 40 from CPU2 through data bus DB (step S2). Data representing the number of bytes is written into the third register R3 from CPU2 through data bus DB (step S3). Furthermore, a transmission request command is written into the first register R1 from CPU2 through data bus DB (step S4). As a result, a transmission instruction signal TR is supplied from register R1.

A counting operation by a counter CT1 is initiated after the contents of the first counter CT1 are reset in response to the transmission instruction signal TR (step S5). Adder 42 adds the count data of counter CT1 to data representing the leading address held in the second register R2 and supplies the result as address signals a11-a0 (step S6). The address signals a11-a0 are provided to memory 10 by address selector 30 (see FIG. 2). As a result, transmission data is read out from memory 10 (step S7).

Data selector 20 transmits the transmission data read out from memory 10 to the external equipment through a data transmission path TP (step S8). Thereafter, the count data of counter CT1 is incremented only by 1 (see FIG. 4) (step S9). Comparator 43 compares the count data of counter CT1 with the data representing the number of bytes held in the third register R3 (step S10). If the count data does not coincide with the data representing the number of bytes, the operations in steps S6-S9 are repeated.

If the count data coincides with the data representing the number of bytes, a coincidence signal EQ is supplied from comparator 43. The coincidence signal EQ is supplied to the first register R1 through OR gate 46 as a reset signal RST. As a result, the contents of the first register R1 are reset (step S11). An output signal of OR gate 46 is applied to CPU2 through bus interface unit 60 as an interruption signal INT (step S12).

Figure 9:
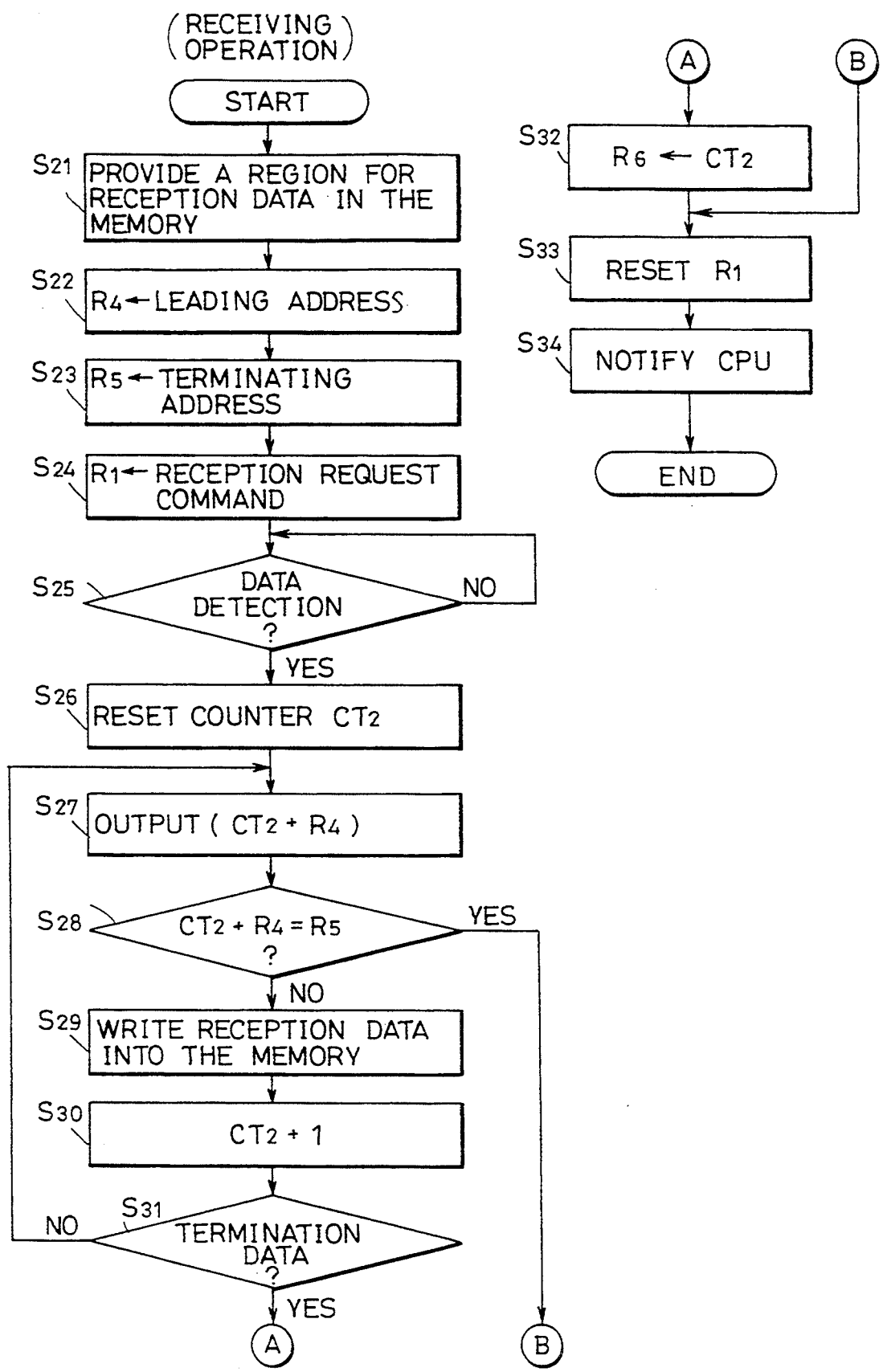
FIG. 9 is a flow chart showing a receiving operation by the I/O device in the embodiment.
Figure 11:
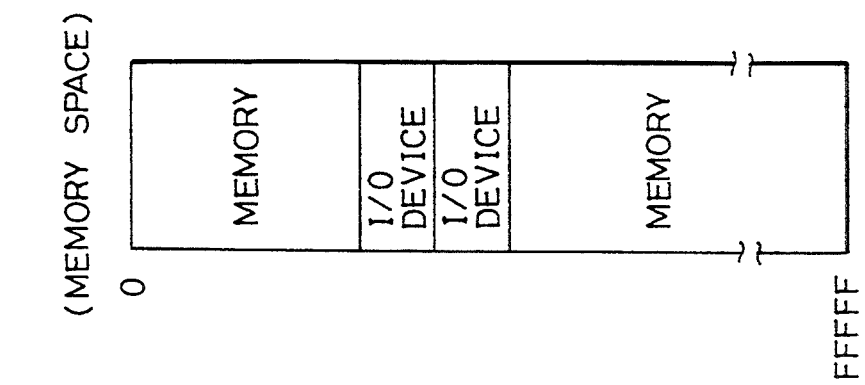
FIG. 11 is a diagram showing an address space in a memory mapped I/O system.
Figure 10:
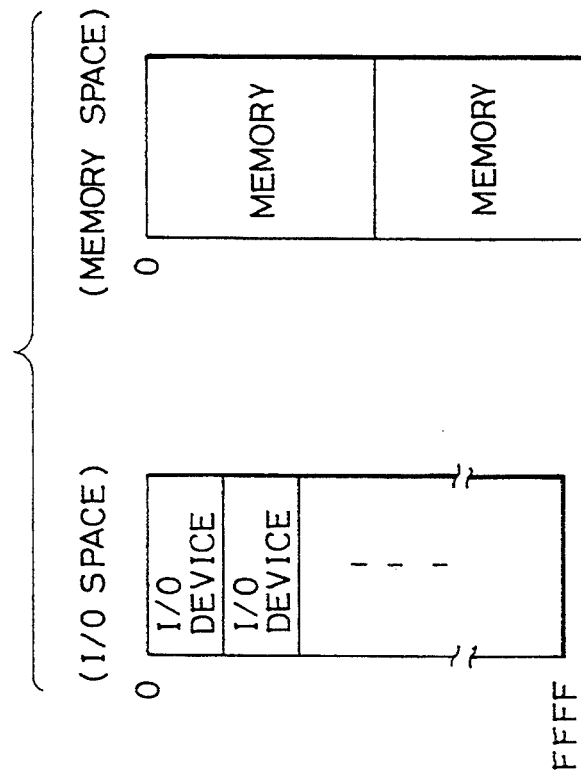
FIG. 10 is a diagram showing an address space in an I/O mapped I/O system.
Figure 12:
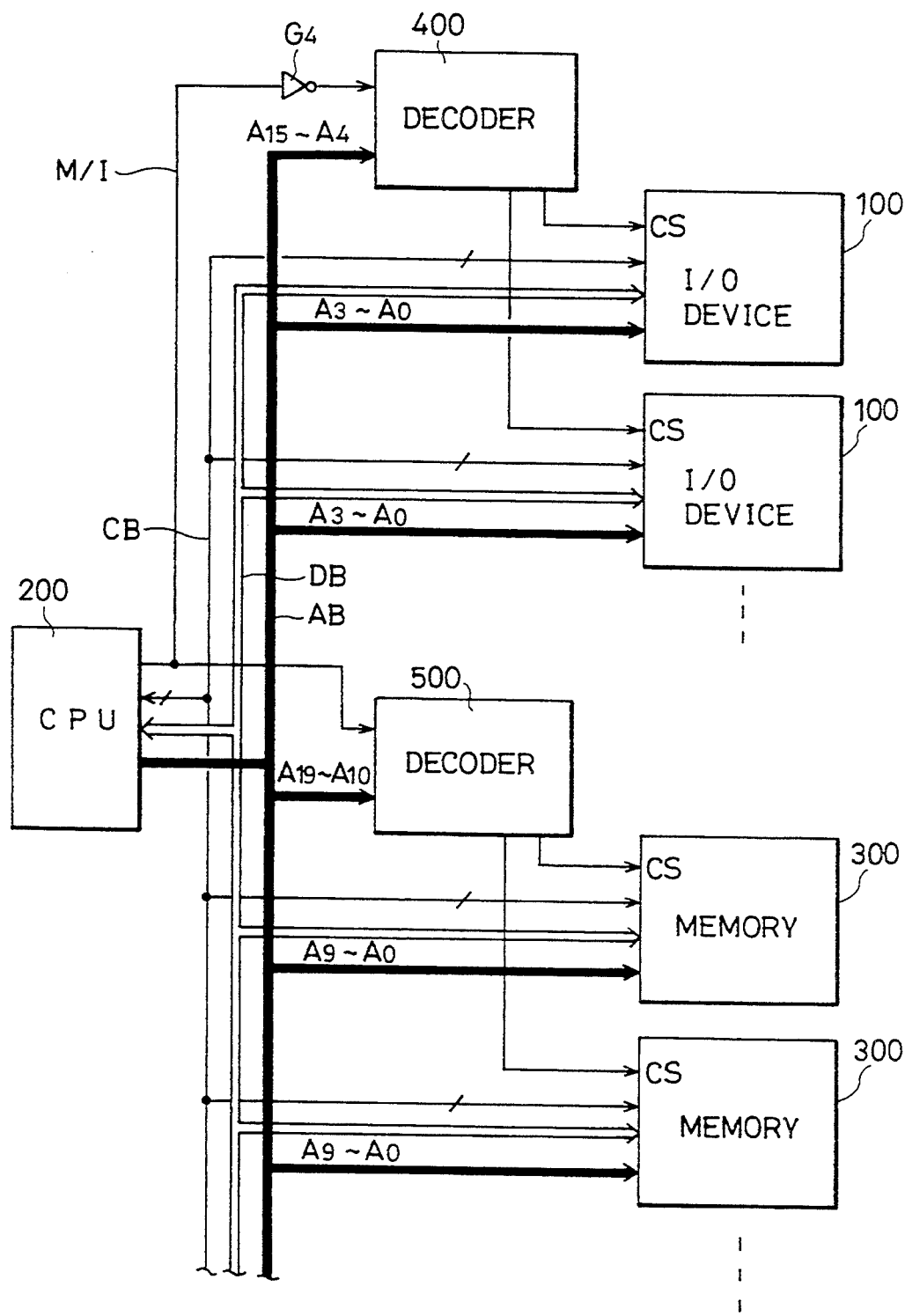
FIG. 12 is a block diagram showing the structure of a conventional I/O mapped I/O system.

A description will now be made of the operation of writing data received from the external equipment into memory 10 with reference to FIG. 9.

At first, a region for reception data is provided within memory 10 in step S21.

Then, the identification signal M/I designates the I/O space. Firstly, data representing the leading address is written into the fourth register R4 shown in FIG. 4 from CPU2 through data bus DB (step S22). Data representing the terminating address is also written into the fifth register R5 from CPU2 through data bus DB (step S23). Furthermore, a reception request command is written into the first register R1 from CPU2 through data bus DB (step S24).

Reception detecting circuit 50 (shown in FIG. 2) detects whether or not the reception data has been supplied to data transmission path TP from the external equipment (step S25). If the reception data has been supplied to data transmission path TP, a detection signal DET is generated. After the contents of the second counter CT2 shown in FIG. 4 are reset in response to the detection signal DET, the counting operation by counter CT2 is started (step S26).

Adder 44 adds the count data of counter CT2 to data representing the leading address held in the fourth register R4 and supplies the result as address signals a11-a0 (step S27).

Comparator 45 compares the address signals a11-a0 supplied from adder 44 with data representing the terminating address held in the fifth register R5 (step S28).

If the address signals a11-a0 do not coincide with data representing the terminating address, the address signals a11-a0 are applied to memory 10 by address selector 30 (see FIG. 2). In addition, data selector 20 supplies the reception data on data transmission path TP to memory 10. As a result, the reception data is written into the address designated by the address signals a1-1-a0 (step S29). Thereafter, the contents of the second counter CT2 are incremented only by 1 (step S30).

Reception detecting circuit 50 detects whether or not the reception data on data transmission path TP is termination data (step S31). If the reception data is not termination data, the operations of steps S27-S30 are repeated.

If the data on data transmission path TP is termination data, the count data of the second counter CT2 is transferred to the sixth register R6 (step S32). The count data transferred to the sixth register R6 is transmitted to CPU2 through data bus DB.

If the address signals a11-a0 coincide with the data representing the terminating address in step S28, a coincidence signal EQ is supplied from comparator 45. The coincidence signal EQ is supplied to the first register R1 through OR gate 46 as a reset signal RST. The contents of the first register R1 are thereby reset (step S33). The output signal of OR gate 46 is applied to CPU2 as an interruption signal INT (step S34).

In the above-mentioned embodiment, as memory 10 is located in the memory space, it is possible to make large the storage capacity of memory 10. Therefore, a large amount of transmission data and reception data can be stored.

Since data for control is held in the first to sixth registers R1-R6 within transmission reception control circuit 40 and transmission data and reception data are not held therein, a large I/O space is not required. Accordingly, even if the I/O space is small, a large amount of data can be inputted to/outputted from the external equipment.

Additionally, as reading of transmission data from memory 10 and writing of reception data to memory 10 are controlled by control data held in the first to sixth registers R1-R6 within transmission reception control circuit 40, the software is made simple.

Furthermore, since data bus DB is released after the control data is transmitted to transmission reception control circuit 40, another processing can be carried out between CPU2 and memory 6 and other equipment.

The identification signal M/I in the embodiment above designates the I/O space when it is at logic "1", for example, and designates the address space when it is at logic "0". Conversely, the identification signal M/I may designate the I/O space when it is at logic "0" and may designate the memory space when it is at logic "1".

Meanwhile, memory 10 includes, for example, a FIFO (First In First Out) memory, and a RAM (Random Access Memory).

It is also possible to arrange each portion within memory 10 in separate spaces.

As stated above, according to the present invention, since the storage device is located in the memory space and the control device is located in the I/O space, a large amount of data can be inputted into/outputted from the external equipment even if the I/O space is small.

Additionally, since reading of data to be transmitted to the external equipment from the storage device and writing of data received from the external equipment into the storage device are carried out in response to control data held in the holding device included in the control device, the software is made simple.

Furthermore, as the data bus is released after the control data is supplied to the holding device included in the control device, the processing efficiency of the system is enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An input/output device for use with a data processor having an address bus and a data bus for controlling inputting/outputting of data to/from external equipment in a separate-type input/output system in which a memory space and an I/O space are separated from each other and an address on the memory space and an address on the I/O space are designated using said address bus, said input/output device comprising:

storage means having an address selector and a data selector respectively coupled to said address bus and said data bus, for storing data received from said data bus to be transmitted to said external equipment and for storing data received from said external equipment to be transmitted to said data bus, said storage means having addresses assigned in the memory space;

control means, coupled to said data selector and said address selector of said storage means, said address bus, and said data bus, said control means including holding means for holding control data received over said data bus, said holding means having addresses assigned in the I/O space, said control means being responsive to the control data held in said holding means for controlling said address selector and said data selector of said storage means to read data from said storage means and transmit said data to said external equipment and to receive data from said external equipment and write said data into said storage means; and designation signal receiving means coupled to said control means for receiving a designation signal designating whether an address signal supplied through said address bus indicates an address of said storage means or said control means, said storage means and said control means being selectively activated in response to said designation signal.

2. The input/output device according to claim 1, wherein said control means further includes address signal generating means responsive to the control data held in said holding means for generating an address signal for addressing said storage means.

3. The input/output device according to claim 2, further comprising address selection means responsive to the control data held in said holding means within said control means for selecting either of an address signal supplied through said address bus and an address signal generated by said address signal generating means and supplying the same to said storage means.

4. The input/output device according to claim 3, further comprising data selection means responsive to the control data held in said holding means within said control means for reading out data to be transmitted to said external equipment from said storage means or writing data received from said external equipment into said storage means.

5. The input/output device according to claim 4, further comprising reception detecting means for detecting that the data from said external equipment has been received, said control means controlling writing of data from said external equipment into said storage means in response to the output of said reception detecting means.

6. The input/output device according to claim 5, wherein said input/output system includes a data bus for transmitting data and a control bus for transmitting a control signal, and said holding means within said control means receives data on said data bus as said control data in response to a control signal supplied through said control bus.

7. The input/output device according to claim 6, wherein said holding means includes a plurality of registers, and said control means further includes selection means responsive to an address signal on said address bus for selecting any of said plurality of registers.

8. The input/output device according to claim 7, wherein said plurality of registers include a register for holding control data representing a leading address, and said control means further includes address signal generating means responsive to the control data held in said holding means for generating an address-signal for addressing said storage means, said address signal generating means includes:

change means for sequentially changing said control data representing the leading address and generating the changed control data as said address signal; and detection means for detecting whether or not said address signal generated by said change means coincides with a prescribed address signal and resetting said change means in response to the detection of a coincidence.

9. The input/output device according to claim 8, wherein said plurality of registers include a register for holding control data representing a transmission request or a reception request, and said change means includes:

count means responsive to said control data representing the transmission request or the reception request for starting a counting operation; and adding means for adding the output of said count means to said control data representing the leading address and generating the result of the addition as said address signal.

10. The input/output device according to claim 7, wherein said plurality of registers include:

a first register for holding control data representing a transmission request;

a second register for holding control data representing a leading address at the time of the transmitting operation;

a third register for holding control data representing the number of bytes;

a fourth register for holding control data representing a leading address at the time of the receiving operation; and a fifth register for holding control data representing a terminating address, and said change means includes:

a first counter responsive to control data supplied from said first register for starting a counting operation;

a first adder for adding the output of said first counter to control data supplied from said second register and generating the result of the addition as said address signal;

a first comparator for comparing control data supplied from said first counter with control data supplied from said third register and generating a reset signal for resetting said first register in response to the detection of a coincidence therebetween;

a second counter responsive to the output of said reception detecting means for starting a counting operation;

a second adder for adding the output of said second counter to control data supplied from said fourth register and generating the result of the addition as said address signal; and a second comparator for comparing the output of said second adder with control data supplied from said fifth register and generating a reset signal for resetting said first register in response to the detection of a coincidence therebetween.

11. A separate-type input/output system having an address bus and a data bus in which a memory space and an I/O space are separated from each other and an address on the memory space and an address on the I/O space are designated using said address bus, comprising:

data processing means for processing data;

designation signal transmitting means for transmitting a designation signal designating whether an address signal supplied through said common address bus indicates an address of a storage means or an address of a control means;

a memory for storing data, to which addresses on the memory space are assigned; and an input/output device for controlling inputting/outputting of data to/from an external equipment, wherein said input/output device includes:

storage means having an address selector and a data selector respectively coupled to said address bus and said data bus, for storing data received from said data bus to be transmitted to said external equipment and for storing data received from said external equipment to be transmitted to said data bus, said storage means having addresses assigned in the memory space;

control means, coupled to said data selector and said address selector of said storage means, said address bus, and said data bus, said control means including holding means for holding control data received over said data bus, said holding means having addresses assigned in the I/O space, said control means being responsive to the control data held in said holding means for controlling said address selector and said data selector of said storage means to read data from said storage means and transmit said data to said external equipment and to receive data from said external equipment and write said data into said storage means; and designation signal receiving means coupled to said control means for receiving a designation signal from said designation signal transmitting means designating whether an address signal supplied through said address bus indicates an address of said storage means or said control means, and selectively activating said storage means or said control means.

12. A method of operating an input/output device for use with a data processor having an address bus and a data bus for controlling inputting/outputting of data to/from an external equipment in a separate-type input/output system in which a memory space and an I/O space are separated from each other and an address on the memory space and an address on the I/O space are designated using said address bus, said input/output device including:

storage means having an address selector and a data selector respectively coupled to said address bus and said data bus, for storing data received from said data bus to be transmitted to said external equipment and for storing data received from said external equipment to be transmitted to said data bus, said storage means having addresses assigned in the memory space; and control means, coupled to said data selector and said address selector of said storage means, said address bus, and said data bus, said control means including holding means for holding control data received over said data bus, said holding means having addresses assigned on the I/O space, said control means being responsive to the control data held in said holding means for controlling said address selector and said data selector of said storage means to read data from said storage means and transmit said data to said external equipment and to receive data from said external equipment and write said data into said storage means;

said method comprising the steps of:

generating a designation signal for designating whether an address signal supplied through said address bus indicates an address of said storage means or said control means, writing data to be transmitted to said external equipment into said storage means or reading data stored in said storage means in response to a designation signal designating the memory space and said address signal;

writing control data into said holding means in response to a designation signal designating the I/O space and said address signal; and reading data to be transmitted to said external equipment from said storage means or writing data received from said external equipment into said storage means in response to the control data held in said holding means.

* * * * *